United States Patent
Tatara

(10) Patent No.: US 9,302,612 B2
(45) Date of Patent: Apr. 5, 2016

(54) VEHICULAR LAMP SYSTEM

(71) Applicant: KOITO MANUFACTURING CO., LTD., Tokyo (JP)

(72) Inventor: Naoki Tatara, Shizuoka (JP)

(73) Assignee: Koito Manufacturing Co., ltd., Tokyo (JP)

( * ) Notice: Subject to any disclaimer, the term of this patent is extended or adjusted under 35 U.S.C. 154(b) by 0 days.

(21) Appl. No.: 14/541,604

(22) Filed: Nov. 14, 2014

(65) Prior Publication Data

US 2015/0158413 A1    Jun. 11, 2015

(30) Foreign Application Priority Data

Dec. 6, 2013    (JP) ................................ 2013-252949

(51) Int. Cl.
| | |
|---|---|
| *B60Q 1/04* | (2006.01) |
| *B60Q 1/14* | (2006.01) |
| *H04W 12/04* | (2009.01) |
| *G06F 21/10* | (2013.01) |
| *H04W 4/08* | (2009.01) |
| *H04W 4/04* | (2009.01) |

(52) U.S. Cl.
CPC ............... *B60Q 1/1423* (2013.01); *G06F 21/10* (2013.01); *H04W 12/04* (2013.01); *B60Q 2900/10* (2013.01); *H04W 4/046* (2013.01); *H04W 4/08* (2013.01)

(58) Field of Classification Search
CPC ............................... B60Q 1/04; B60Q 2900/30
USPC ....................................................... 315/77, 82
See application file for complete search history.

(56) References Cited

U.S. PATENT DOCUMENTS

| | | | |
|---|---|---|---|
| 2012/0032594 A1* | 2/2012 | Hagner | B60Q 1/085 315/82 |
| 2014/0091709 A1* | 4/2014 | Choi | B60Q 1/04 315/82 |

FOREIGN PATENT DOCUMENTS

| | | |
|---|---|---|
| JP | 2002-193026 A | 7/2002 |
| JP | 2006021631 | 1/2006 |
| JP | 2009179121 | 8/2009 |
| KR | 10-2013-0104330 A | 9/2013 |

* cited by examiner

*Primary Examiner* — Daniel D Chang

(74) *Attorney, Agent, or Firm* — Abelman, Frayne & Schwab

(57) ABSTRACT

The present disclosure provides a vehicular lamp system in which modification or addition of functions of a lamp may be performed even after a vehicle is purchased. The vehicular lamp system includes a lamp unit; a vehicle storage unit configured to store first identification information; a communication unit configured to communicate with an external storage unit which stores second identification information corresponding to the first identification information, and function information associated with the second identification information and related to a user's selected function of the lamp unit; and a control unit configured to control an operation of the lamp unit. The communication unit acquires the function information associated with the second identification information corresponding to the first identification information from the external storage unit, and the control unit operates the lamp unit based on the function information to execute a specific function.

15 Claims, 8 Drawing Sheets

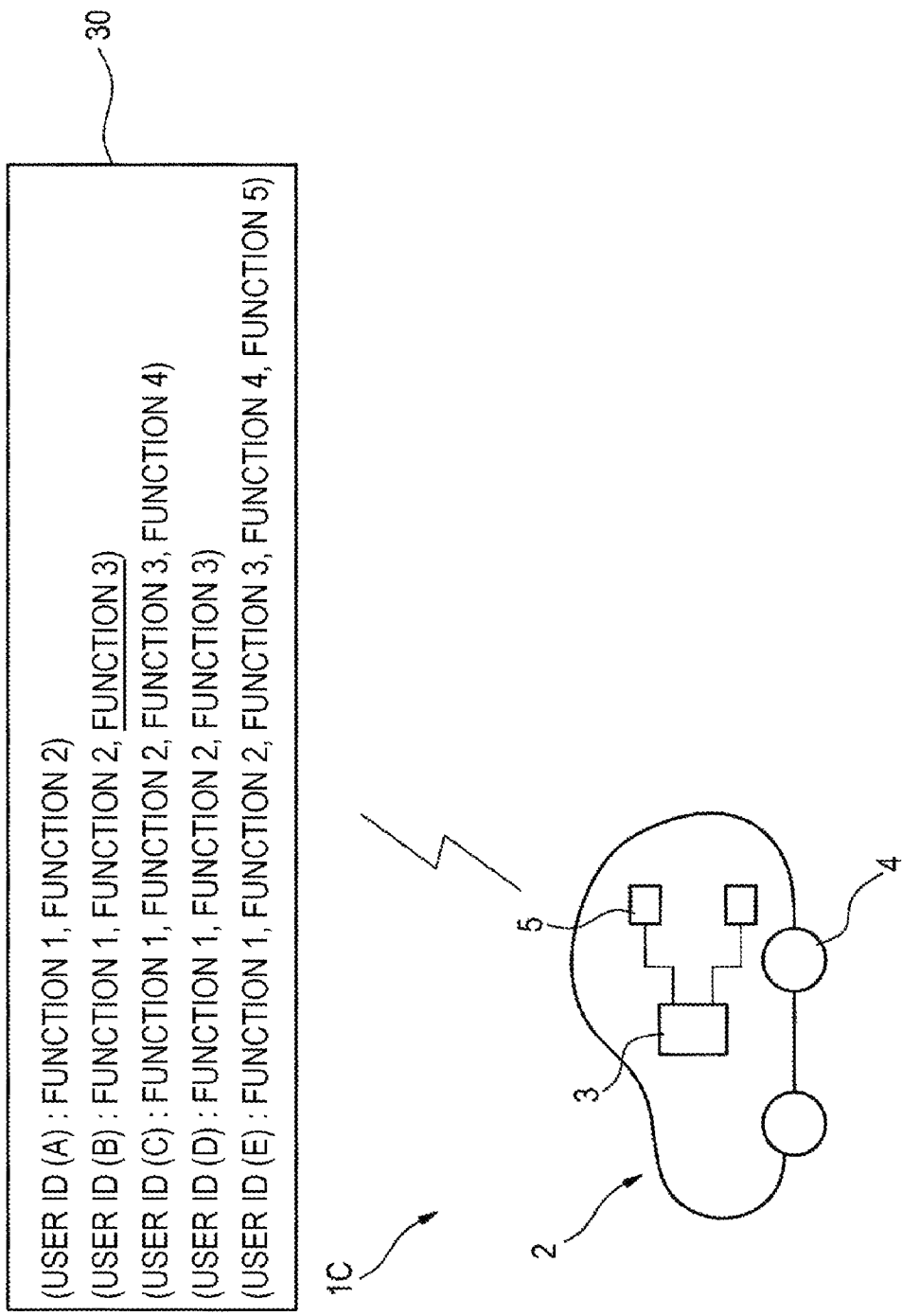

VEHICULAR LAMP SYSTEM

CROSS-REFERENCE TO RELATED APPLICATIONS

This application is based on and claims priority from Japanese Patent Application No. 2013-252949, filed on Dec. 6, 2013, with the Japanese Patent Office, the disclosure of which is incorporated herein in its entirety by reference.

TECHNICAL FIELD

The present disclosure relates to a vehicular lamp system.

BACKGROUND

Japanese Patent Laid-Open Publication No. 2006-21631 discloses a vehicular lighting system which includes a plurality of light sources and illuminates a dangerous object by independently varying directions of the plurality of light sources. The plurality of light sources illuminates different regions, respectively, and forms a predetermined light distribution pattern as a whole.

Also, Japanese Patent Laid-Open Publication No. 2009-179121 discloses a vehicular headlight device which includes a high beam lamp unit employing, for example, a liquid crystal film in a light-shielding member to form a light-shielding region in a desired shape. The vehicular headlight device is configured to perform irradiation control so that glare is not given to, for example, oncoming vehicles, preceding vehicles, or pedestrians even during high beam irradiation.

SUMMARY

Convenience for a user has been improved by various functions disclosed Japanese Patent Laid-Open Publication No. 2006-21631 or No. 2009-179121. However, in the functions disclosed in Japanese Patent Laid-Open Publication No. 2006-21631 or No. 2009-179121, it is necessary for a purchaser ("user") to determine whether to mount a specific lamp configured to execute the functions in a vehicle when purchasing the vehicle. That is, even if the user considers adding the above-described functions or modifying existing functions after purchasing the vehicle, the addition or modification of the functions may not be performed unless the existing vehicle is replaced with a newly purchased vehicle.

Therefore, an object of the present disclosure is to provide a vehicular lamp system in which functions of a lamp may be modified or added even after a vehicle is purchased.

According to the present disclosure, there is provided a vehicular lamp system. The vehicular lamp system includes a lamp unit; a vehicle storage unit configured to store first identification information; a communication unit configured to communicate with an external storage unit which stores second identification information corresponding to the first identification information, and function information associated with the second identification information and related to a user's selected function of the lamp unit; and a control unit configured to control an operation of the lamp unit. The communication unit acquires the function information associated with the second identification information corresponding to the first identification information from the external storage unit, and the control unit operates the lamp unit based on the function information to execute a specific function.

According to the vehicular lamp system according to the present disclosure, function information is acquired through the communication unit, and a specific function is executed according to the acquired function setting information. Thus, modification or addition of functions may be performed even after a vehicle is purchased.

According to the present disclosure, in the vehicular lamp system, the first identification information may be information related to the lamp unit. According to the vehicular lamp system according to the present disclosure, the lamp unit may be operated based on the function information appropriate for the lamp unit.

According to the present disclosure, in the vehicular lamp system, the first identification information may be information related to a vehicle mounted with the lamp unit. According to the vehicular lamp system according to the present disclosure, the specific function may be executed in a specific vehicle.

According to the present disclosure, in the vehicular lamp system, the vehicle storage unit is configured to store a plurality of operation programs which operates the lamp unit, and the control unit may read out the specific operation programs from the vehicle storage unit according to the function information. According to the vehicular lamp system according to the present disclosure, traffic between the vehicle and the external storage unit may be reduced.

According to the present disclosure, in the vehicular lamp system, the function information may be an operation program which operates the lamp unit. According to the vehicular lamp system according to the present disclosure, only operation programs required for the vehicle storage unit may be stored, and thus a vehicle storage unit with a small storage capacity may be mounted in the vehicle.

According to the present disclosure, in the vehicular lamp system, the external storage unit may include an information terminal which is owned by a user independently of a vehicle. The information terminal may be configured to store the specific second identification information, and the function information associated with the second identification information, and the communication unit may acquire the function information from the information terminal which has the specific second identification information corresponding to the first identification information. According to the vehicular lamp system according to the present disclosure, the vehicle only has to communicate with an information terminal such as a smart phone, and thus a communication unit capable of communicating in a relatively short distance may be employed.

According to the present disclosure, in the vehicular lamp system, the external storage unit may include a data server provided outside the vehicle. The data server may store a plurality of second identification information, and a plurality of function information associated with the plurality of second identification information, respectively, and the communication unit may acquire the function information associated with the specific second identification information corresponding to the first identification information. According to the vehicular lamp system according to the present disclosure, the data server has a large storage capacity, and thus the external data server may store various information. Therefore the user may select preferred functions among various functions.

According to the present disclosure, in the vehicular lamp system, the external storage unit may include an information terminal which is owned by a user independently of a vehicle, and a data server provided outside the vehicle. The information terminal may be configured to store the specific second identification information. The data server may be configured to store a plurality of second identification information, and a plurality of function information associated with the plurality of second identification information, respectively, and the communication unit may acquire the second identification information from the information terminal. The communication unit may transmit the specific second identification information corresponding to the first identification information to the data server to acquire the function information associated with the specific second identification information from the data server. According to the vehicular lamp system according to the present disclosure, since the vehicular lamp system may be used by an information terminal, there is no need to newly mount a dedicated device in the vehicle.

With the vehicular lamp system according to the present disclosure, a vehicular lamp system in which lamp functions may be modified or added even after a vehicle is purchased may be provided.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 9 is a schematic view illustrating a use state of a vehicular lamp system according to a fourth exemplary embodiment of the present disclosure.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, a vehicular lamp system according to exemplary embodiments of the present disclosure will be described in detail with reference to drawings.

First Exemplary Embodiment

A vehicular lamp system according to a first exemplary embodiment of the present disclosure, which will be described below, is effective when a user needs to add a new function to a lamp or modify a lamp function set at the time of purchase of a vehicle after newly purchasing the vehicle.

Figure 1:
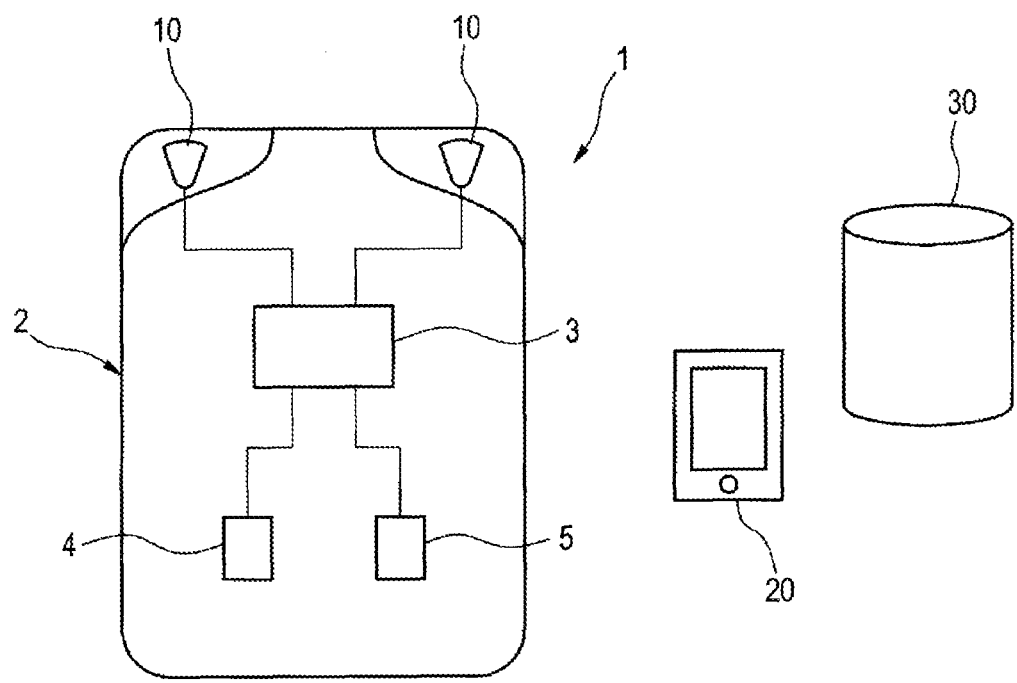
FIG. 1 is a schematic view of a vehicular lamp system according to an exemplary embodiment of the present disclosure.

FIG. 1 is a schematic configuration view of a vehicular lamp system 1 according to the present exemplary embodiment. As illustrated in FIG. 1, the vehicular lamp system 1 includes a lamp unit 10, an electronic control unit (ECU) 3, an on-vehicle memory 4 (an example of an on-vehicle storage unit), and a communication unit 5. All of the lamp unit 10, the ECU 3 (an example of a control unit), the on-vehicle memory 4, and the communication unit 5 are mounted in a vehicle 2. Both the on-vehicle memory 4 and the communication unit 5 are connected to the ECU 3.

The ECU 3 serves as a control unit for controlling an operation of the lamp unit 10. The on-vehicle memory 4 stores vehicle identification information (hereinafter, referred to as a "vehicle ID") specific for the vehicle 2, and a plurality of operation programs for executing specific operations in the lamp unit 10. The communication unit 5 is a device capable of communicating with a smart phone 20 or an external data server 30. The smart phone 20 is an exemplary information terminal owned by the user independently of the vehicle 2. The external data server 30 is a data center having a large storage capacity.

Figure 2:
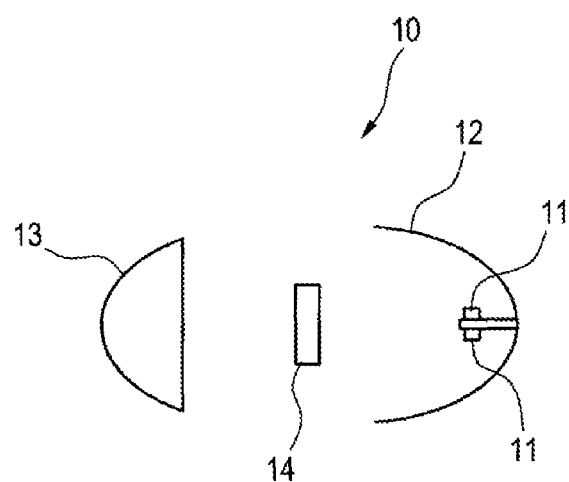
FIG. 2 is a schematic view of a lamp unit used for the vehicular lamp system.

FIG. 2 is a schematic view of the lamp unit 10 used for the vehicular lamp system 1. The lamp unit 10 is a lamp which may freely form light distribution patterns in various shapes in front of the lamp. As illustrated in FIG. 2, the lamp unit 10 includes two light sources 11, a reflector 12, a projection lens 13, and a liquid crystal image forming unit 14.

The reflector 12 reflects the light emitted from the light sources 11 toward the front side of the lamp. The projection lens 13 is provided in front of the light sources 11. The liquid crystal image forming unit 14 is provided between the light sources 11 and the projection lens 13. The projection lens 13 is provided such that its rear focus is located on the image forming surface of the liquid crystal image forming unit 14.

The liquid crystal image forming unit 14 includes a plurality of liquid crystal elements arranged in a matrix on the image forming surface. The plurality of liquid crystal elements may be individually controlled to transmit the light emitted from the light sources 11 or not to transmit the light emitted from the light sources 11. The plurality of liquid crystal elements may be individually controlled so that two-dimensional images in various shapes may be formed on the image forming surface.

The projection lens 13 projects the two-dimensional images formed on the image forming surface to the front side of the lamp so as to form light distribution patterns. The ECU controls the liquid crystal image forming unit 14 to form a two-dimensional image in a desired shape so that a desired light distribution pattern is formed on the lamp unit 10.

For example, the ECU 3 may form various light distribution patterns on the lamp unit 10, besides a high beam light distribution pattern used for normal night traveling, and a low beam light distribution pattern used when vehicles pass by each other. Examples of the light distribution pattern which may be formed by the lamp unit 10 may include a pedestrian irradiation pattern, a traveling lane forming pattern, an OHS irradiation pattern, and an ADB irradiation pattern.

The pedestrian irradiation pattern refers to a light distribution pattern which irradiates light to a pedestrian present in the vicinity of the vehicle to notify a driver of the presence of the pedestrian.

The traveling lane forming pattern refers to a light distribution pattern which forms a virtual traveling lane on a road surface as a guide when the vehicle is traveling so as to assist the night driving of the driver.

The OHS irradiation pattern refers to a light distribution pattern which irradiates light to an indicator located above the road surface (an over-head sign) so as to assist the night driving of the driver.

The ADB irradiation pattern is a kind of high beam light distribution pattern which does not irradiate light in a region of preceding vehicles or oncoming vehicles. The ADB is an abbreviation of Adaptive Driving Beam.

For example, it is assumed that a user selected functions for forming a pedestrian irradiation pattern as well as a high beam irradiation pattern and a low beam irradiation pattern in a lamp when purchasing a vehicle.

In the conventional technology, it is impossible to modify or add functions of the lamp after purchasing the vehicle, unlike in the present exemplary embodiment. Accordingly, even if the user wants a function for forming a traveling lane forming pattern after purchasing the vehicle, the user has no choice but to replace the existing lamp unit with a new one or to purchase a new vehicle.

In the present exemplary embodiment, a new function may be added to a purchased vehicle or an existing function may be modified without replacing the existing lamp unit with a new one or purchasing a new vehicle.

Figure 3:
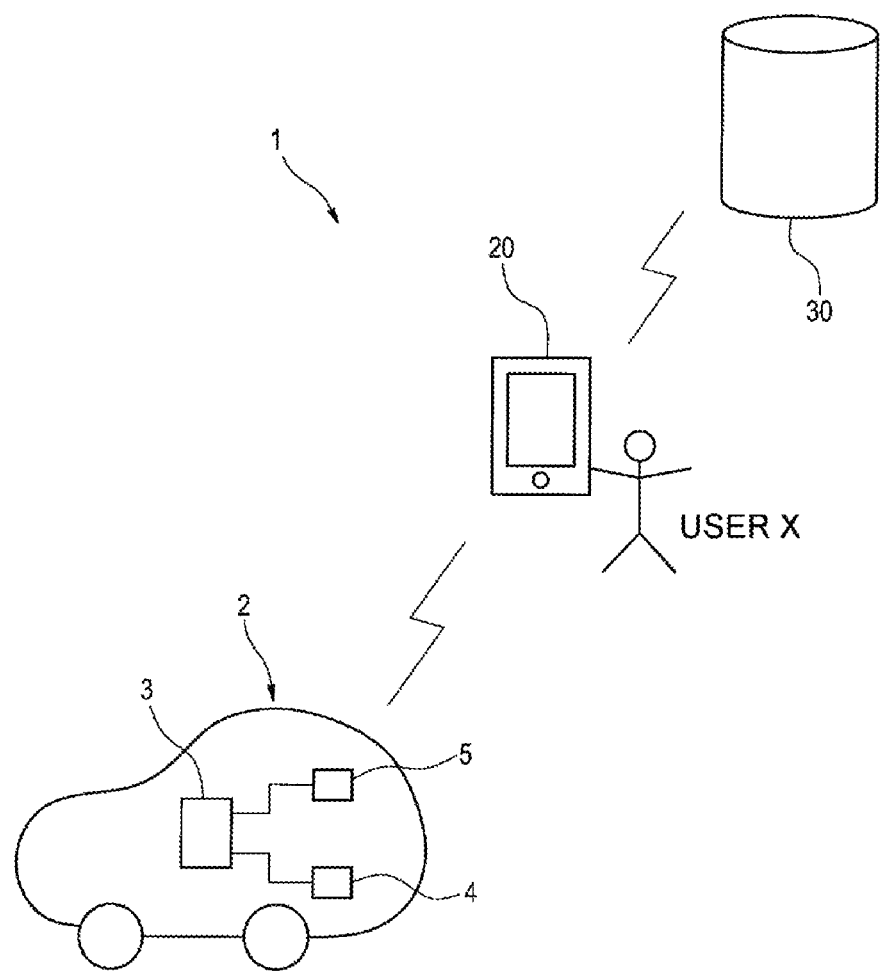
FIG. 3 is a schematic view illustrating a use state of a vehicular lamp system according to a first exemplary embodiment of the present disclosure.
Figure 4:
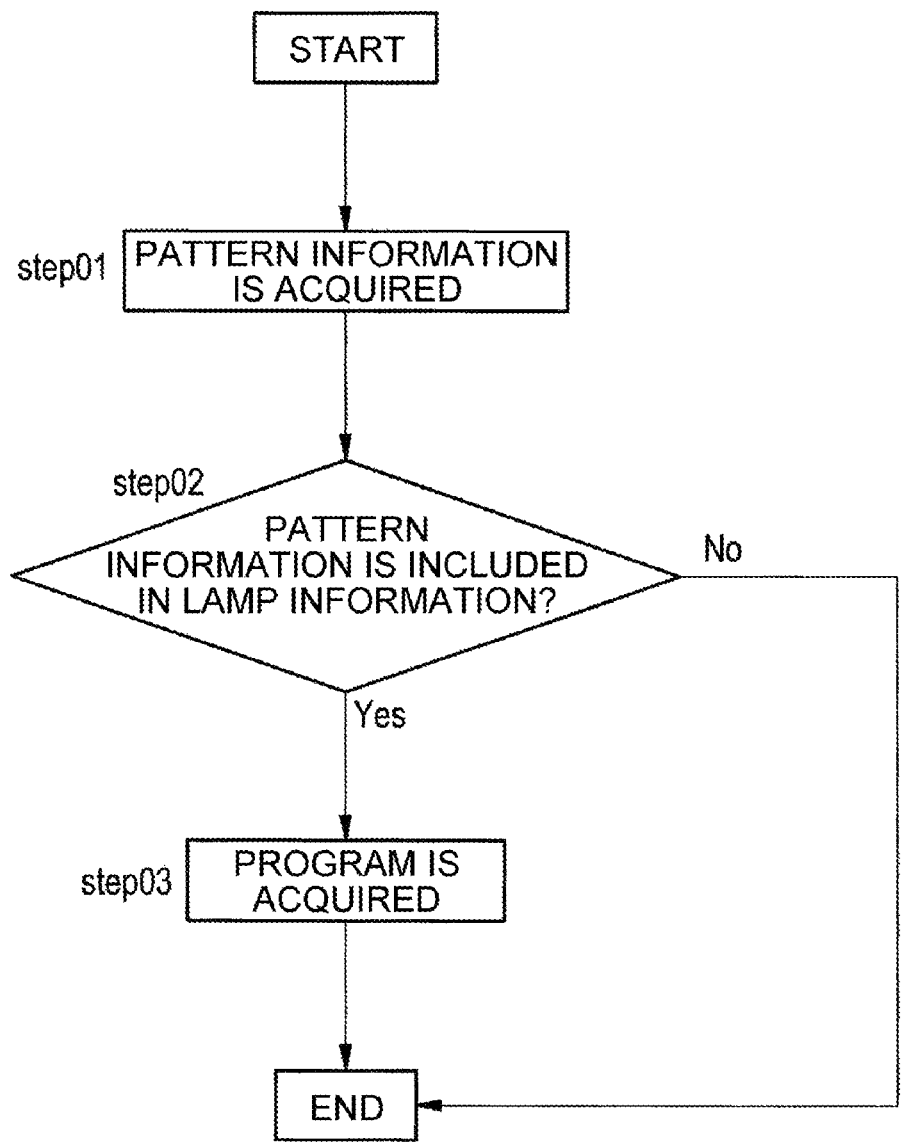
FIG. 4 is a flow chart of a processing when a new function is added to a lamp unit by using the vehicular lamp system illustrated in FIG. 3.

FIG. 3 is a schematic view illustrating a use state of the vehicular lamp system 1. FIG. 4 is a flow chart of a processing when a new function is added to the lamp unit 10 by using the vehicular lamp system 1.

Hereinafter, descriptions will be made on, for example, addition of a function of a traveling lane forming pattern to the lamp unit 10 provided with the functions of the high beam light distribution pattern, the low beam light distribution pattern and the pedestrian irradiation pattern, with reference to FIGS. 3 and 4.

(Purchase of Function)

A user X who wants to add a function of a traveling lane forming pattern to the lamp unit 10 first accesses the external data server 30 through the smart phone 20 owned by the user X to purchase the function of the traveling lane forming pattern.

A unit or method for purchasing a function is not limited to this example. For example, besides the smart phone 20, for example, a personal computer or an input device mounted in the vehicle may be used as for a unit for accessing the external data server 30. As for the input device mounted in the vehicle, not only a dedicated input device, but also a navigation system in which software is installed to have a function capable of accessing the external data server 30 may be employed.

When verifying that the user X has purchased the function of the traveling lane forming pattern, the external data server 30 transmits a program for executing the function of the traveling lane forming pattern, and information of a light distribution pattern to be executed by the program (hereinafter, referred to as "pattern information") to the smart phone 20 owned by the user X. The smart phone 20 stores the transmitted program and pattern information in a storage device (an example of an external storage unit) within the smart phone 20.

Then, the user X transmits the acquired pattern information to the lamp unit 10 of the vehicle 2, to which the user wants to add the function, from the smart phone 20. The ECU 3 of the vehicle 2 receives the pattern information through the communication unit 5 and stores the pattern information in the on-vehicle memory 4 (step 01). Then, the ECU 3 compares the pattern information (an example of second identification information) transmitted from the smart phone 20 to lamp information (an example of first identification information) which has been stored in the on-vehicle memory 4 in advance (step 02).

Here, the lamp information stored in the on-vehicle memory 4 is information on the lamp unit 10 mounted in the vehicle 2. In the present exemplary embodiment, the lamp information corresponds to a list of light distribution patterns executable by the lamp unit 10. Specifically, the lamp unit 10 of the present exemplary embodiment may control the liquid crystal image forming unit 14 so that the shape of the light distribution pattern may be changed into various shapes, or moved. Accordingly, the lamp unit 10 may form almost all the light distribution patterns which are expected to be formed by a headlight. Thus, the lamp information of the present exemplary embodiment includes almost all the light distribution patterns, including the traveling lane forming pattern, which are expected to be formed by a headlight.

The liquid crystal image forming unit 14 may be controlled so that the lamp unit 10 may be used as for a fog lamp, a daytime running lamp, or a vehicular marker lamp. Therefore, the lamp information of the present exemplary embodiment includes light distribution patterns which allow the lamp unit 10 to serve as the fog lamp, the daytime running lamp, or the vehicular marker lamp.

Meanwhile, it is assumed that the lamp unit 10 according to the present exemplary embodiment is provided at the front side of the vehicle 2 to be used as a headlight. Thus, the lamp unit 10 cannot be used in an aspect of a turn signal lamp or a marker lamp. Therefore, the lamp information of the present exemplary embodiment does not include a light distribution pattern for executing the turn signal lamp, or a light distribution pattern for executing the marker lamp.

The pattern information transmitted from the smart phone 20 corresponds to the lamp information. In the present exemplary embodiment, the pattern information is information indicating the traveling lane forming pattern, and in other exemplary embodiments, may be, for example, information indicating an ADB light distribution pattern, or information indicating a light distribution pattern for the turn signal lamp.

When the user X wants to add a function for forming the traveling lane forming pattern to the lamp unit 10, the ECU 3 compares the pattern information (the second identification information) indicating the traveling lane forming pattern, which is acquired from the smart phone 20, to the lamp information (the first identification information) stored in the on-vehicle memory 4. Since the traveling lane forming pattern is included in the lamp information (step 02: Yes), the ECU 3 acquires a program (function information) for executing the traveling lane forming pattern from the smart phone 20 (the external storage unit) through the communication unit 5, and stores the acquired program in the on-vehicle memory 4 (step 03).

Accordingly, the ECU 3 operates the lamp unit 10 to form the traveling lane forming pattern based on the program for executing the traveling lane forming pattern, which is stored in the on-vehicle memory 4, so that the function for forming the traveling lane forming pattern is executed. In this manner, the function of the traveling lane forming pattern is added to the lamp unit 10 provided with the functions of the high beam light distribution pattern, the low beam light distribution pattern, and the pedestrian irradiation pattern. Therefore, even after the user X purchases the vehicle 2, a new function may be added to the lamp unit 10, thereby improving convenience of the user X.

In this manner, the communication unit 5 communicates with the smart phone 20 which stores the pattern information (the second identification information) corresponding to the lamp information (the first identification information), and the program (the function information) associated with the pattern information and configured to execute the function of the lamp unit 10 selected by the user X. The communication unit 5 acquires the program associated with the pattern information which corresponds to the lamp information and indicates the traveling lane forming pattern, and configured to execute the traveling lane forming pattern from the smart phone 20. The ECU 3, based on the acquired program for executing the traveling lane forming pattern, operates the lamp unit 10 to execute the traveling lane forming pattern. Since a widely distributed smart phone may be used as for the smart phone 20, there is no need to newly provide an input device for adding a function in the vehicle 2. Thus, the vehicular lamp system 1 may be introduced into the vehicle 2 at a low cost.

In the present exemplary embodiment, when the user X wants to add, for example, a function of a turn signal lamp to the lamp unit 10, the ECU 3 determines that the pattern information (the second identification information) indicating the turn signal lamp is not included in the lamp information (the first identification information) stored in the on-vehicle memory 4 (step 02: No). Thus, the ECU 3 does not acquire a program for executing the turn signal lamp and does not store the program in the on-vehicle memory 4. Here, the ECU 3 may transmit a signal indicating that the above described function cannot be executed in the lamp unit 10 to the smart phone 20 through the communication unit 5. Meanwhile, in this case, the program non-executable by the lamp unit 10 may be stored in the on-vehicle memory 4 but may not be executed by control of the ECU 3.

In the present exemplary embodiment, the smart phone 20 (an example of an information terminal) owned by the user X independently of the vehicle 2 becomes the external storage unit. The smart phone 20 stores the pattern information (the second identification information), and the program (the function information) associated with the pattern information. The communication unit 5 acquires the program from the smart phone 20 which has the specific pattern information corresponding to the lamp information (the first identification information).

In the above described first exemplary embodiment, the ECU 3 compares the lamp information as the first identification information, to the pattern information as the second identification information, but the present disclosure is not limited thereto. For example, the lamp information stored in the on-vehicle memory 4 may be transmitted to the external data server 30 through the smart phone 20 so that the external data server 30 may determine whether the lamp information corresponds to the function the user X wants to purchase. In the case of the above described example, when the user X purchases the function of the traveling lane forming pattern, the external data server 30 may allow the purchase, and when the user X purchases the function of the turn signal lamp, the external data server 30 may not allow the purchase.

Besides the ECU 3 or the external data server 30, the smart phone 20 may be configured to compare the lamp information as the first identification information to the pattern information as the second identification information.

In the present exemplary embodiment, the first identification information is information on the lamp unit 10, and especially, the first identification information includes a plurality of light distribution patterns executable by the lamp unit 10. Thus, it is possible to suppress the ECU 3 from executing a non-executable program in the lamp unit 10.

Modified Example of First Exemplary Embodiment

In the above-described first exemplary embodiment, light distribution patterns executable by the lamp unit 10 are included in the lamp information, but the present disclosure is not limited thereto. For example, the on-vehicle memory 4 may store a model number of the lamp unit 10 as the lamp information. The modified example will be described below.

In the present modified example, the user X stores the model number (first identification information) of the lamp unit 10, which is stored in the on-vehicle memory 4 of the vehicle 2, in the smart phone 20, before purchasing a new function for the lamp unit 10.

When the user X wants to add a new function to the lamp unit 10, first, the smart phone 20 transmits the model number (as lamp information) of the lamp unit 10 to the external data server 30. The external data server 30 stores a plurality of model numbers of lamp units, and a plurality of function lists (second identification information) associated with the lamp units of the model numbers, respectively, and executable by the lamp units of the model numbers, respectively. The external data server 30 reads out the model number of the lamp unit 10 acquired from the user X and transmits a function list executable by the lamp unit 10 of the model number to the smart phone 20 of the user X. The user X may select a function to purchase among functions included in the function list acquired from the external data server 30.

When the user X purchases a new function, a program (function information) for executing the function is transmitted from the smart phone 20 to the on-vehicle memory 4 through the communication unit 5 to be stored. The program for executing the purchased function is information associated with each function registered in the function list, and especially, related to the function of the lamp unit 10 which is selected by the user X.

In this manner, the communication unit 5 acquires the program (the function information) associated with the function list (the second identification information) corresponding to the model number (the first identification information) of the lamp unit 10, from the external data server 30. The ECU 3, based on the acquired program, operates the lamp unit 10 so as to execute the specific function purchased by the user X.

In the modified example, the external data server 30 provided outside the vehicle 2 becomes an external storage unit. The external data server 30 stores a plurality of function lists (the second identification information), and a plurality of programs (the function information) for executing the functions associated with the function lists, respectively. The communication unit 5 acquires a program associated with the specific function list corresponding to the lamp information (the first identification information).

In the first exemplary embodiment and the modified example thereof, descriptions have been made on an example in which the smart phone 20 is used, but the present disclosure is not limited thereto. In another configuration, the ECU 3 may directly communicate with the external data server 30 through the communication unit 5. In this case, an input device is provided in the vehicle 2 so as to allow the user X to additionally input a function. The above-described vehicular lamp system 1 may be provided without using a special device such as the smart phone 20.

Second Exemplary Embodiment

In the above-described first exemplary embodiment, descriptions has been made on an example in which it is determined whether a function to be newly added by the user X is executable by the lamp unit 10, by using information on the lamp unit 10 as first identification information, but the present disclosure is not limited thereto. In second to fourth exemplary embodiments to be described below, information on the vehicle 2 mounted with the lamp unit 10 is used as the first identification information.

Figure 5:
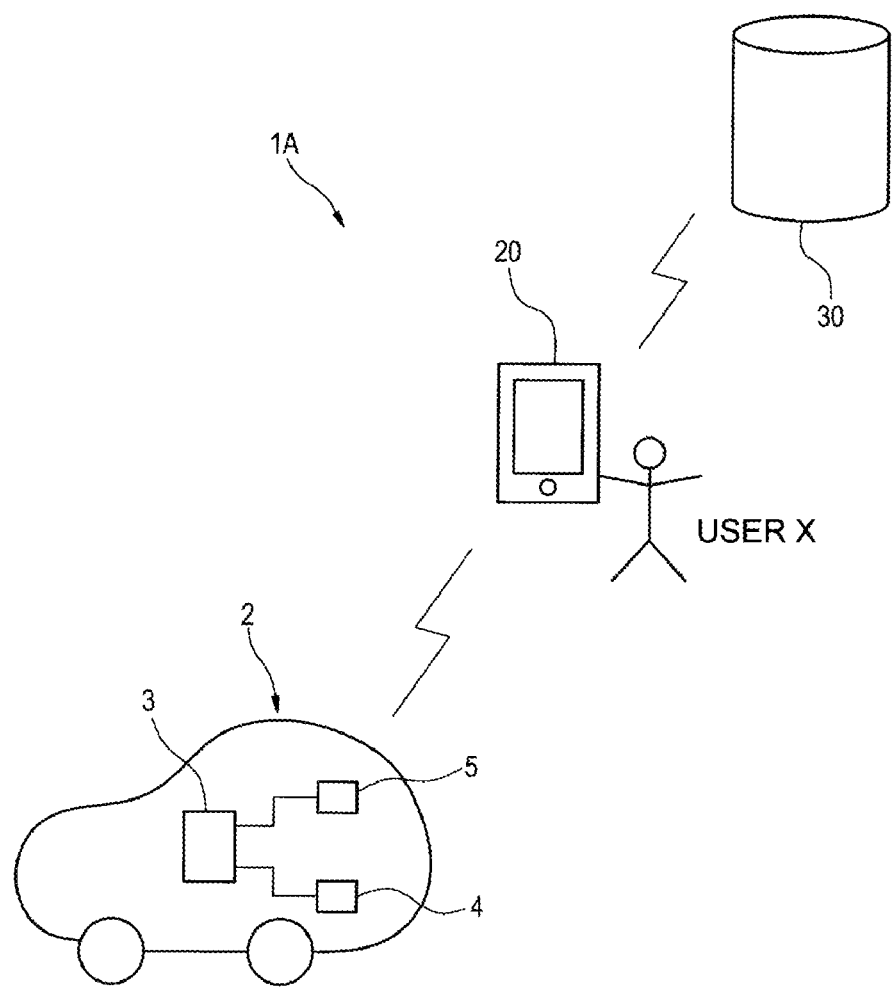
FIG. 5 is a schematic view illustrating a use state of a vehicular lamp system according to a second exemplary embodiment of the present disclosure.
Figure 6:
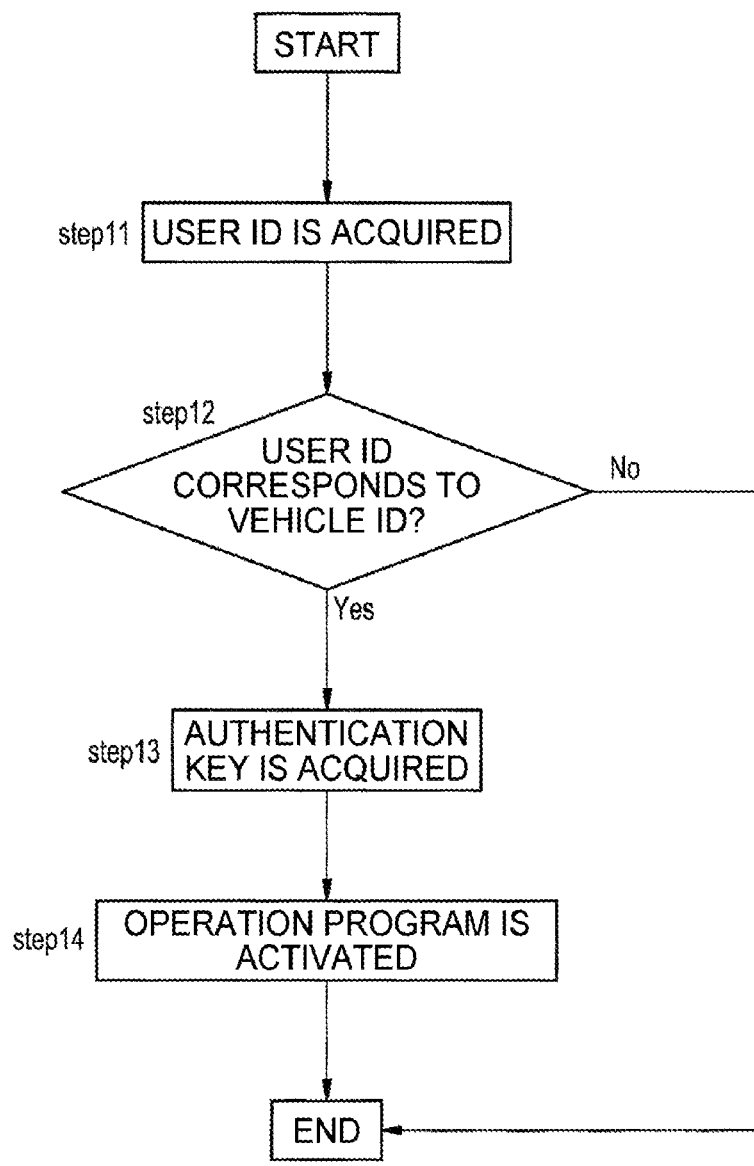
FIG. 6 is a flow chart of a processing when a new function is added to a lamp unit by using the vehicular lamp system illustrated in FIG. 5.

FIG. 5 is a schematic view illustrating a use state of a vehicular lamp system 1A. FIG. 6 is a flow chart of a processing when a new function is added to a lamp unit 10 by using the vehicular lamp system 1A.

Descriptions will be made on the vehicular lamp system 1A according to the second exemplary embodiment of the present disclosure, for example, addition of a function of a traveling lane forming pattern to the lamp unit 10 provided with the functions of the high beam light distribution pattern, the low beam light distribution pattern and the pedestrian irradiation pattern, with reference to FIGS. 5 and 6.

(Purchase of Function)

A user X who wants to add a function of a traveling lane forming pattern to the lamp unit 10 first accesses the external data server 30 through the smart phone 20 owned by the user X to purchase the function of the traveling lane forming pattern.

When verifying that the user X has purchased the function of the traveling lane forming pattern, the external data server 30 transmits an authentication key associated with the function of the traveling lane forming pattern to the smart phone 20 owned by the user X. The smart phone 20 stores the transmitted authentication key in a storage device (an example of an external storage unit) within the smart phone 20.

A unit or method for purchasing a function is not limited to this example. For example, besides the smart phone 20, a personal computer or an input device mounted in the vehicle may be used as for a unit for accessing the external data server 30. As for the input device mounted in the vehicle, not only a dedicated input device, but also a navigation system in which software is installed to have a function capable of accessing the external data server 30 may be employed.

(Acquisition of User ID)

Subsequently, the user X approaches the vehicle 2 with the smart phone 20 stored with the authentication key to issue a communication request from the smart phone 20 to the ECU 3 of the vehicle 2. The ECU 3 responds to the communication request issued from the smart phone 20 through the communication unit 5, and requests user identification information (hereinafter, referred to as a "user ID") of the smart phone 20 through the communication unit 5. In response to the request, the smart phone 20 transmits the user ID stored in the storage device of the smart phone 20 to the ECU 3 through the communication unit 5. Accordingly, the ECU 3 acquires the user ID (step 11). The user ID is information specific for a user, by which a plurality of users may be distinguished from each other.

(Comparison of User ID to Vehicle ID)

Then, the ECU 3 compares the acquired user ID to a vehicle ID stored in the on-vehicle memory 4 to determine if both correspond to each other (step 12). Accordingly, it is determined if an owner of the vehicle 2 coincides with an owner of the smart phone 20. When the user ID corresponds to the vehicle ID, the ECU 3 performs subsequent processings (step 12: Yes), while when the user ID does not correspond to the vehicle ID, the ECU 3 terminates the process (step 12: No). Accordingly, the subsequent processings are performed only in response to communication from the owner of the vehicle 2.

(Acquisition of Authentication Key)

Then, the ECU 3 requests, through the communication unit 5, that the smart phone 20 transmit the authentication key stored in the smart phone 20. When the communication unit 5 acquires the authentication key, the ECU 3 stores the authentication key in the on-vehicle memory 4 (step 13).

(Activation of Operation Program)

Subsequently, the ECU 3 activates an operation program corresponding to the authentication key stored in the on-vehicle memory 4 (step 14). The on-vehicle memory 4 stores a plurality of operation programs for operating the lamp unit 10 to execute functions for forming the above described various light distribution patterns. The operation programs are locked at a usual time, and may not be executed by the ECU 3. However, when the ECU 3 acquires the above described authentication key, the operation program corresponding to the authentication key is unlocked by the ECU 3 to be executed.

In the present example, the operation program which operates the lamp unit 10 to form the traveling lane forming pattern is activated. Also, in the present example, an operation program which operates the lamp unit 10 to form the high beam light distribution pattern, an operation program which operates the lamp unit 10 to form the low beam light distribution pattern, and an operation program which operates the lamp unit 10 to form the pedestrian irradiation pattern have already been activated.

Through the above-described processing, the function for forming the traveling lane forming pattern is added to the lamp unit 10. Accordingly, the ECU 3 may execute corresponding functions in the lamp unit 10 by using operation programs which are activated and stored in the on-vehicle memory 4. The operation programs are configured to operate the lamp unit 10 to form the high beam light distribution pattern, the low beam light distribution pattern, the pedestrian irradiation pattern, and the traveling lane forming pattern.

According to the vehicular lamp system 1A according to the present exemplary embodiment, the communication unit 5 acquires the authentication key (the function information) associated with the user ID (the second identification information) corresponding to the vehicle ID (the first identification information), from the smart phone 20 (the external storage unit), and the ECU 3 operates the lamp unit 10 by the corresponding operation program based on the authentication key to execute a specific function. Accordingly, even after the user X purchases the vehicle 2, a new function may be added to the lamp unit 10, thereby improving convenience of the user X.

In the present exemplary embodiment, since an authentication key is transmitted from the smart phone 20 to the communication unit 5, traffic between the smart phone 20 and the communication unit 5 may be reduced.

Also, according to the vehicular lamp system 1A according to the present exemplary embodiment, since the vehicular lamp system 1A may be used by an information terminal such as the smart phone 20, it is not necessary to newly mount a dedicated device in the vehicle 2. Thus, the vehicular lamp system 1A may be introduced into the vehicle 2 at a low cost.

In the above-described descriptions, an example in which a new function is added to the lamp unit 10 has been described, but an existing function may be modified. For example, a function for forming a general high beam light distribution pattern which does not change a light distribution pattern may be changed into an ADB light distribution pattern which is a high beam light distribution pattern partially provided with a light-shielding region to move the light-shielding region according to, for example, oncoming vehicles. In this case, the function of forming the high beam light distribution pattern may be replaced with a function of forming the ADB light distribution pattern.

Various operation programs stored in the on-vehicle memory 4 may be additionally registered at any time. In this case, the operation programs are added in a state where the operation programs are locked so as not to be executed without authentication keys. Accordingly, even when a new function is developed after the vehicle 2 is purchased, the vehicle 2 may be ready to execute the new function.

Third Exemplary Embodiment

In the above-described first and second exemplary embodiments, descriptions have been made on an example in which a new function is added to the lamp unit 10 or an existing function is modified after the vehicle 2 is purchased, but the present disclosure is not limited thereto. In a vehicular lamp system 1B according to the third exemplary embodiment of the present disclosure, which will be described below, in a case where a single vehicle 2 is shared by a plurality of people (so-called car sharing), the lamp unit 10 provided in the single vehicle 2 is operated by a function selected by each user.

Also, in the above-described second exemplary embodiment, descriptions have been made on an example in which the operation program which has been stored in the on-vehicle memory 4 in advance is activated by the authentication key acquired by the smart phone 20, but the present disclosure is not limited thereto. The third exemplary embodiment to be described below is an example in which the operation program downloaded to the smart phone 20 from the external data server 30 is transmitted to the on-vehicle memory 4.

Also, in the above-described second exemplary embodiment, descriptions have been made on an example in which the smart phone 20 constitutes an external storage unit, but in the third exemplary embodiment to be described below, the external storage unit is a concept including the smart phone 20 and the external data server 30.

In the following description, when a vehicle 2 shared by a plurality of users A to E is used by user C through the vehicular lamp system 1B according to the present exemplary embodiment, the lamp unit 10 is operated by a function selected by user C. As for the lamp unit 10, the lamp unit illustrated in FIG. 2, which has been described in the first and second exemplary embodiments, may be employed in the present exemplary embodiment.

Figure 7:
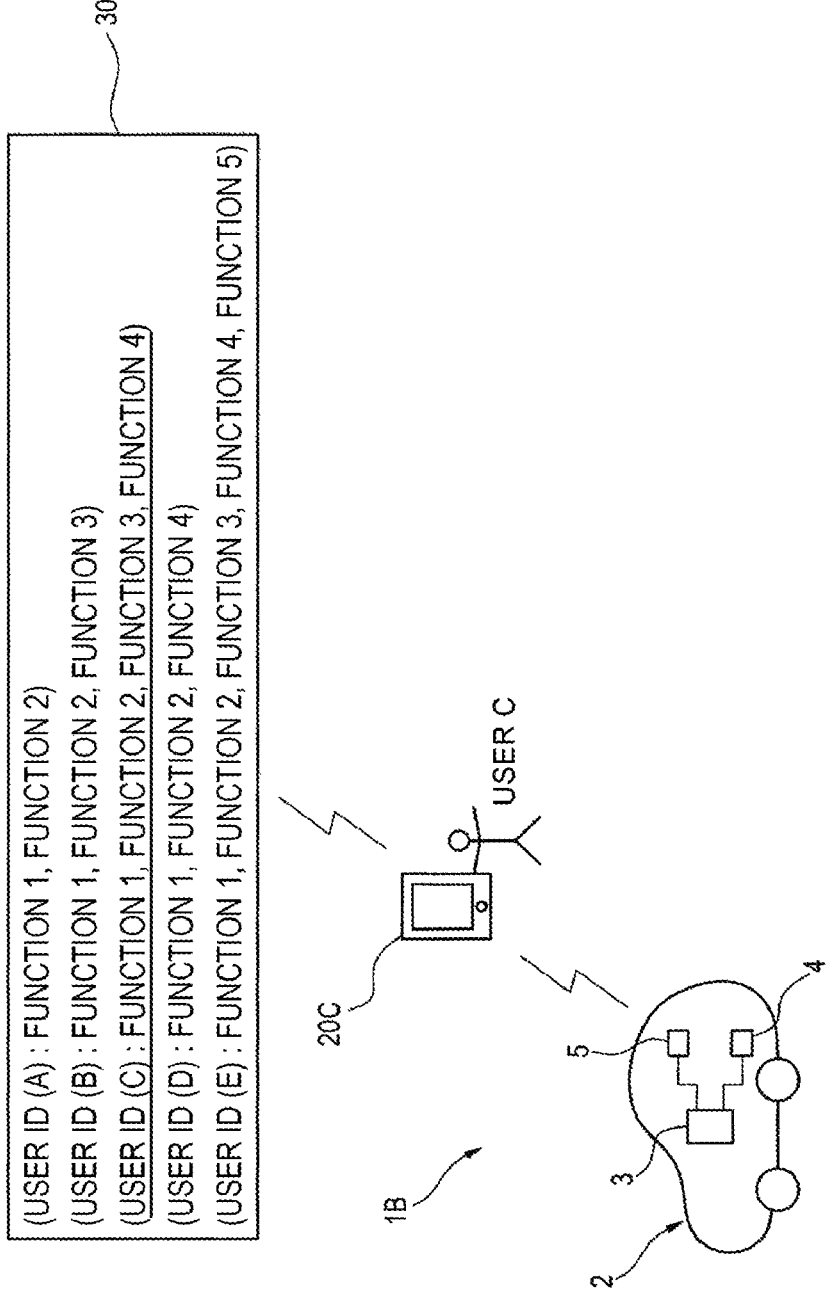
FIG. 7 is a schematic view illustrating a use state of a vehicular lamp system according to a third exemplary embodiment of the present disclosure.
Figure 8:
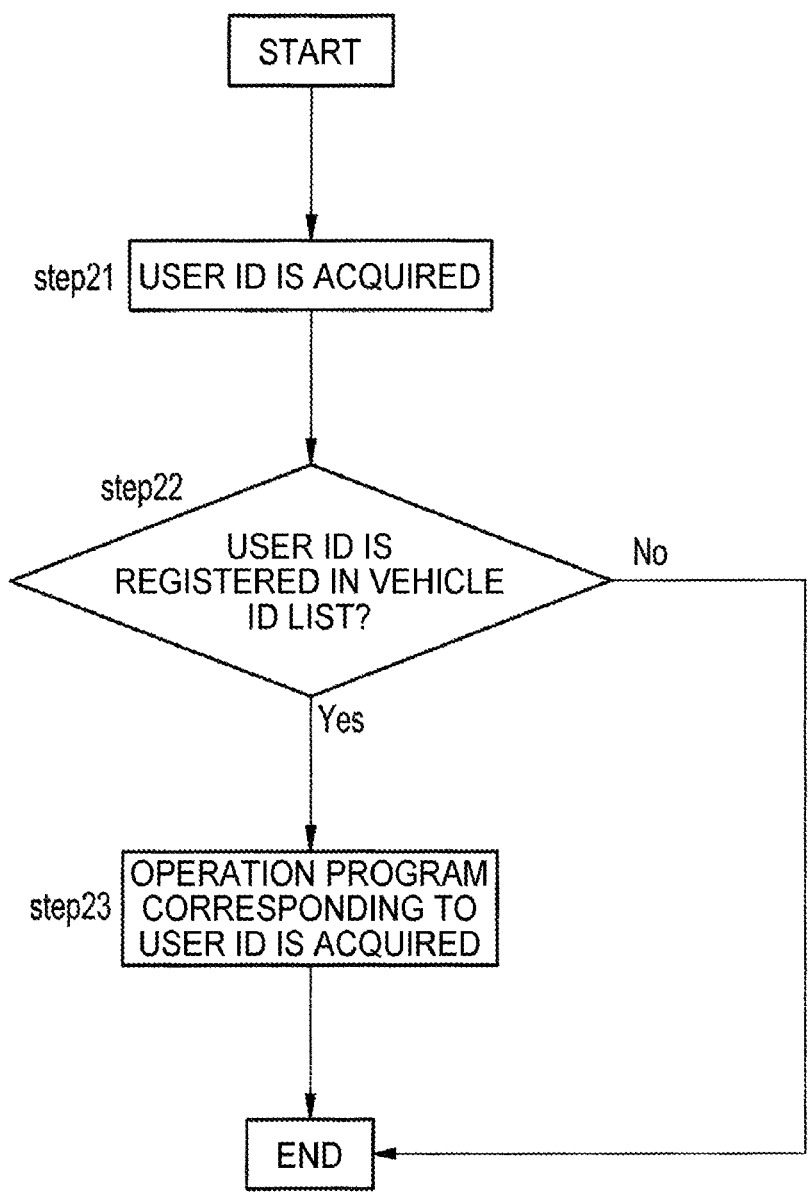
FIG. 8 is a flow chart of a processing when a function selected by a specific user is executed in a lamp unit by using the vehicular lamp system illustrated in FIG. 7.

FIG. 7 is a schematic view illustrating a use state of a vehicular lamp system 1B. FIG. 8 is a flow chart of a processing when a new function is added to the lamp unit 10 by using the vehicular lamp system 1B.

(External Data Server)

The external data server 30 stores user IDs A to E corresponding to users A to E and function information associated with the user IDs. The function information indicates functions of the lamp unit 10 which are selected and purchased by the users, respectively. In the present exemplary embodiment, the external data server 30 stores operation programs for executing various functions of the lamp unit 10 independently of the user IDs.

In FIG. 7, Function 1 indicates a function of forming a high beam light distribution pattern, Function 2 indicates a function of forming a low beam light distribution pattern, Function 3 indicates a function of forming a pedestrian irradiation pattern, Function 4 indicates a function of forming a traveling lane forming pattern, and Function 5 indicates a function of forming an ADB irradiation pattern, respectively.

In the illustrated example, the user C selects Function 1 for forming the high beam light distribution pattern in the lamp unit 10, Function 2 for forming the low beam light distribution pattern, Function 3 for forming the pedestrian irradiation pattern, and Function 4 for forming the traveling lane forming pattern.

First, the user C accesses the external data server 30 from a smart phone 20C owned by the user C. The user ID C indicating the user C is transmitted from the smart phone 20C owned by the user C to the external data server 30.

When acquiring the user ID C, the external data server 30 reads out Function information 1, 2, 3 and 4 associated with the user ID C. The external data server 30 transmits operation programs corresponding to Function information 1 to 4 to the smart phone 20C owned by the user C. The smart phone 20C stores the respective operation programs corresponding to Function information 1 to 4 in a storage medium therein.

In the illustrated example, the storage medium in the smart phone 20C stores operation programs for operating the lamp unit 10 to form the high beam light distribution pattern, the low beam light distribution pattern, the pedestrian irradiation pattern, and the traveling lane forming pattern, respectively.

(Acquisition of User ID)

Subsequently, the user C approaches the vehicle 2 with the smart phone 20C storing these operation programs to issue a communication request from the smart phone 20C to the ECU 3 of the vehicle 2. The ECU 3 responds to the communication request issued from the smart phone 20C through the communication unit 5, and requests a user ID of the smart phone 20C through the communication unit 5. In response to the request, the smart phone 20C transmits the user ID C stored in the storage device of the smart phone 20C to the ECU 3 through the communication unit 5. Accordingly, the ECU 3 acquires the user ID C (step 21).

(Comparison of User ID to Vehicle ID)

Then, the ECU 3 compares the acquired user ID C to each of user IDs stored in the on-vehicle memory 4 to determine whether both correspond to each other. In the on-vehicle memory 4, a list of users who can use the vehicle 2 [users A, B, C, D, and E in the present example] is registered. When the acquired user ID C is included in the on-vehicle memory, the ECU 3 performs subsequent processings (step 22: Yes), while when the acquired user ID C is not registered in the on-vehicle memory, the ECU 3 terminates the process (step 22: No). Accordingly, the subsequent processings are performed only in a response to communication from the user who can use the vehicle 2.

(Acquisition of Operation Program)

Then, the ECU 3 requests, through the communication unit 5, that the smart phone 20C transmit the operation programs stored in the smart phone 20C. In response to the request, the smart phone 20C transmits the stored operation programs to the ECU 3. The ECU 3 acquires the transmitted operation programs, and stores the operation programs in the on-vehicle memory 4 (step 23).

In the illustrated example, the on-vehicle memory 4 stores the operation programs for operating the lamp unit 10 to form the high beam light distribution pattern, the low beam light distribution pattern, the pedestrian irradiation pattern, and the traveling lane forming pattern, respectively.

Through the above-described processing, the lamp unit 10 mounted in the vehicle 2 may execute functions selected by the user C using the operation programs stored in the on-vehicle memory 4. The functions are set to form the high beam light distribution pattern, the low beam light distribution pattern, the pedestrian irradiation pattern, and the traveling lane forming pattern.

According to the vehicular lamp system 1B according to the present exemplary embodiment, the communication unit 5 acquires the operation programs (the function information) associated with the user ID (the second identification information) corresponding to the vehicle ID (the first identification information), from the smart phone 20 (a part of the external storage unit), and the ECU 3 (the control unit) operates the lamp unit 10 by the operation programs to execute specific functions. Accordingly, even when a single vehicle 2 is shared by a plurality of users, the lamp unit 10 may be operated by functions selected by each user. This improves convenience of users.

In the above-described example, descriptions have been made on an example in which the vehicular lamp system 1B of the present exemplary embodiment is used in so-called car sharing, but the vehicular lamp system 1B of the present exemplary embodiment may also be used for a rental car, that is, a single vehicle 2 used by a plurality of people. That is, in the rental car, functions selected by a specific user may be executed in the lamp unit 10.

Also, like in the vehicular lamp system 1A according to the first and second exemplary embodiments, in the vehicular lamp system 1B according to the present exemplary embodiment, a new function may be added to the lamp unit 10, or an existing function may be modified even after a user purchases the vehicle 2. Thus, convenience of the user is improved.

The vehicular lamp system 1B according to the present exemplary embodiment stores only required operation programs in the on-vehicle memory 4. That is, unlike the above described second exemplary embodiment, there is no need to store various locked operation programs in the on-vehicle memory 4 in advance. Thus, a memory with a small storage capacity may be employed as the on-vehicle memory 4.

Also, in the vehicular lamp system according to the present exemplary embodiment, the external data server 30 has a larger storage capacity than, for example, the smart phone 20, and thus may store various information. Thus, a user may select preferred functions among various functions.

Fourth Exemplary Embodiment

In the above-described first to third exemplary embodiments, descriptions have been made on an example in which the vehicle 2 communicates with the smart phone 20, but the present disclosure is not limited thereto. In the fourth exemplary embodiment to be described below, the vehicle 2 directly communicates with the external data server 30. Also, the lamp unit 10 illustrated in FIG. 2 may also be used in the present exemplary embodiment.

Hereinafter, descriptions will be made on a case where a function (Function 3) for forming a pedestrian irradiation pattern is added to the lamp unit 10 when a user B owns a specific vehicle 2, and already has a function (Function 1) for forming a high beam light distribution pattern, and a function (Function 2) for forming a low beam light distribution pattern.

FIG. 9 is a schematic view illustrating a use state of a vehicular lamp system 1C according to the present exemplary embodiment. As illustrated in FIG. 9, in the vehicular lamp system 1C of the present exemplary embodiment, the external data server 30 stores a plurality of vehicle IDs (vehicle IDs A to E), and various function information (Functions 1 to 5) associated with the vehicle IDs. When the user B purchases Function 3, the external data server 30 stores Function 3 in addition to Functions 1 and 2, to be associated with the user B.

When the user B operates, for example, an input device of a vehicle, the ECU 3 of the vehicle 2 transmits a vehicle ID stored in the on-vehicle memory 4 to the external data server 30 through the communication unit 5. When acquiring the vehicle ID, the external data server 30 reads out function information associated with the vehicle ID transmitted from the vehicle 2. The external data server 30 transmits operation programs corresponding to the function information to the communication unit 5. When the external data server 30 does not include a vehicle ID corresponding to the transmitted vehicle ID, the external data server 30 notifies the communication unit 5 that the corresponding vehicle ID is not present.

In the illustrated example, when a vehicle ID B is transmitted from the communication unit 5, the external data server 30 reads out Function information 1, 2 and 3 associated with the vehicle ID B. The external data server 30 transmits operation programs corresponding to Function information 1, 2 and 3, respectively, to the communication unit 5, the operation programs being configured to operate the lamp unit 10 to form the high beam light distribution pattern, the low beam light distribution pattern, and the pedestrian irradiation pattern.

The ECU 3 acquires the operation programs from the external data server 30 through the communication unit 5, and stores the operation programs in the on-vehicle memory 4. The ECU 3 may execute the operation programs stored in the on-vehicle memory 4 so as to execute functions for forming the high beam light distribution pattern, the low beam light distribution pattern, and the pedestrian irradiation pattern in the lamp unit 10.

According to the vehicular lamp system 1C according to the present exemplary embodiment, the communication unit 5 acquires the operation programs (the function information) associated with the vehicle ID (the second identification information) corresponding to the vehicle ID (the first identification information) stored in the on-vehicle memory 4, from the external data server 30 (the external storage unit), and the ECU 3 (the control unit) operates the lamp unit by the operation programs to execute specific functions. Accordingly, addition or modification of functions of the lamp unit 10 may be performed even after a user purchases a vehicle.

Also, the user may input a user ID through an input device of a vehicle, and the ECU 3 may transmit the user ID to the external data server 30 through the communication unit 5 and acquire function information associated with the user ID from the external data server 30. According to this configuration, even when a single vehicle 2 is shared by a plurality of users, the lamp unit 10 may be operated by functions selected by each user. This improves convenience of users.

OTHER MODIFIED EXAMPLES

In the above described first to fourth exemplary embodiments, the lamp unit 10 provided with the liquid crystal image forming unit 14 is used, but the present disclosure is not limited thereto. For example, a lamp unit employing a digital mirror device (DMD) or a galvano mirror may be used.

The DMD is a device provided with a plurality of reflecting surfaces of which directions are independently changeable, respectively. The DMD may be used in place of the liquid crystal image forming unit 14 of the above-described exemplary embodiments. A state where a reflecting surface is directed at a particular direction, and light is emitted from the reflecting surface to a front side of a lamp may be set as an ON state, and a state where the reflecting surface is directed at other directions, and light is not emitted from the reflecting surface to the front side of the lamp may be set as an OFF state. Then, a desired optical image may be formed by controlling the ON or OFF states of individual reflecting surfaces. Accordingly, the lamp unit may form a desired light distribution pattern.

A scanning type image forming device employing a galvano mirror is configured to reflect light from a light source with a high directivity by a rotatable galvano mirror. The galvano mirror is rotated while the light is reflected so that the reflected light is scanned in a particular direction. A scanning line may be sequentially shifted to be irradiated to the front side of the lamp so that light distribution pattern in a desired shape may be formed at the front side of the lamp.

A lamp unit applicable to the vehicular lamp system of the present disclosure is not limited to the lamp unit provided with the liquid crystal image forming device or the scanning type image forming device. For example, a conventionally known lamp unit capable of forming a plurality of light distribution patterns, such as a lamp unit provided with a movable shade, or a lamp unit provided with a swivel mechanism, may be employed.

Also, the example described in the second exemplary embodiment, in which an operation program which has been stored in the on-vehicle memory 4 in advance is activated by an authentication key acquired by the smart phone 20, may be employed in the first exemplary embodiment and a modified example thereof. In this case, the authentication key corresponds to the function information. That is, in the first exemplary embodiment and the modified example thereof, the on-vehicle memory 4 may store a program for operating the lamp unit 10, and the ECU 3 may read out a specific program from the on-vehicle memory 4 according to the acquired authentication key as the function information.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicular lamp system comprising:
a lamp unit;
a vehicle storage unit configured to store first identification information;
a communication unit configured to communicate with an external storage unit which stores second identification information corresponding to the first identification information, and function information associated with the second identification information and related to a user's selected function of the lamp unit; and
a control unit configured to control an operation of the lamp unit,
wherein the communication unit acquires the function information associated with the second identification information corresponding to the first identification information from the external storage unit, and
the control unit operates the lamp unit based on the function information to execute a specific function, and
wherein the external storage unit includes an information terminal which is owned by a user independently of a vehicle, and a data server provided outside the vehicle,
the information terminal is configured to store the specific second identification information,
the data server is configured to store a plurality of second identification information, and a plurality of function information associated with the plurality of second identification information, respectively, the communication unit acquires the second identification information from the information terminal, and
the communication unit transmits the specific second identification information corresponding to the first identification information to the data server to acquire the function information associated with the specific second identification information from the data server.

2. The vehicular lamp system of claim 1, wherein the first identification information is related to the lamp unit.

3. The vehicular lamp system of claim 2, wherein the external storage unit includes an information terminal which is owned by a user independently of a vehicle,
the information terminal is configured to store the specific second identification information, and the function information associated with the second identification information, and
the communication unit acquires the function information from the information terminal which has the specific second identification information corresponding to the first identification information.

4. The vehicular lamp system of claim 2, wherein the external storage unit includes a data server provided outside the vehicle,
the data server stores a plurality of second identification information, and a plurality of function information associated with the plurality of second identification information, respectively, and
the communication unit acquires the function information associated with the specific second identification information corresponding to the first identification information.

5. The vehicular lamp system of claim 1, wherein the first identification information is related to a vehicle mounted with the lamp unit.

6. The vehicular lamp system of claim 5, wherein the external storage unit includes an information terminal which is owned by a user independently of a vehicle,
the information terminal is configured to store the specific second identification information, and the function information associated with the second identification information, and
the communication unit acquires the function information from the information terminal which has the specific second identification information corresponding to the first identification information.

7. The vehicular lamp system of claim 5, wherein the external storage unit includes a data server provided outside the vehicle,
the data server stores a plurality of second identification information, and a plurality of function information associated with the plurality of second identification information, respectively, and
the communication unit acquires the function information associated with the specific second identification information corresponding to the first identification information.

8. The vehicular lamp system of claim 1, wherein the vehicle storage unit is configured to store a plurality of operation programs which operates the lamp unit, and
the control unit reads out the specific operation programs from the vehicle storage unit according to the function information.

9. The vehicular lamp system of claim 8, wherein the external storage unit includes an information terminal which is owned by a user independently of a vehicle, the information terminal is configured to store the specific second identification information, and the function information associated with the second identification information, and the communication unit acquires the function information from the information terminal which has the specific second identification information corresponding to the first identification information.

10. The vehicular lamp system of claim 8, wherein the external storage unit includes a data server provided outside the vehicle, the data server stores a plurality of second identification information, and a plurality of function information associated with the plurality of second identification information, respectively, and the communication unit acquires the function information associated with the specific second identification information corresponding to the first identification information.

11. The vehicular lamp system of claim 1, wherein the function information is an operation program which operates the lamp unit.

12. The vehicular lamp system of claim 11, wherein the external storage unit includes an information terminal which is owned by a user independently of a vehicle, the information terminal is configured to store the specific second identification information, and the function information associated with the second identification information, and the communication unit acquires the function information from the information terminal which has the specific second identification information corresponding to the first identification information.

13. The vehicular lamp system of claim 11, wherein the external storage unit includes a data server provided outside the vehicle, the data server stores a plurality of second identification information, and a plurality of function information associated with the plurality of second identification information, respectively, and the communication unit acquires the function information associated with the specific second identification information corresponding to the first identification information.

14. The vehicular lamp system of claim 1, wherein the external storage unit includes an information terminal which is owned by a user independently of a vehicle, the information terminal is configured to store the specific second identification information, and the function information associated with the second identification information, and the communication unit acquires the function information from the information terminal which has the specific second identification information corresponding to the first identification information.

15. The vehicular lamp system of claim 1, wherein the external storage unit includes a data server provided outside the vehicle, the data server stores a plurality of second identification information, and a plurality of function information associated with the plurality of second identification information, respectively, and the communication unit acquires the function information associated with the specific second identification information corresponding to the first identification information.

* * * * *